United States Patent [19]

Sood et al.

[11] Patent Number: 5,420,492
[45] Date of Patent: May 30, 1995

[54] METHOD AND APPARATUS OF OPERATING A DYNAMOELECTRIC MACHINE USING DC BUS CURRENT PROFILE

[75] Inventors: Pradeep K. Sood, St. Louis; James L. Skinner, Florissant; Douglas M. Petty, Clayton, all of Mo.

[73] Assignee: Emerson Electric Co., St. Louis, Mo.

[21] Appl. No.: 4,411

[22] Filed: Jan. 14, 1993

[51] Int. Cl.⁶ .......................... H02P 5/40; H02P 1/26
[52] U.S. Cl. ................................... 318/809; 318/803; 318/254
[58] Field of Search .................. 363/37, 57, 58, 139; 318/254, 138, 439, 701, 722, 723, 732, 800, 807, 802, 809, 803

[56] References Cited

U.S. PATENT DOCUMENTS

| | | | |
|---|---|---|---|
| 4,086,519 | 4/1978 | Perssor | 318/254 |
| 4,162,435 | 7/1979 | Wright | 318/138 |
| 4,169,990 | 10/1979 | Lerdman | 318/138 |
| 4,250,435 | 2/1981 | Alley et al. | 318/138 |
| 4,314,189 | 2/1982 | Okado et al. | 318/732 |
| 4,427,933 | 1/1984 | Wagener et al. | 318/809 |
| 4,459,519 | 7/1984 | Erdman | 318/254 |
| 4,491,772 | 1/1985 | Bitting | 318/254 |
| 4,499,408 | 2/1985 | Bitting et al. | 318/254 |
| 4,500,821 | 2/1985 | Bitting et al. | 318/254 |
| 4,540,921 | 9/1985 | Boyd, Jr. et al. | 318/254 |
| 4,556,827 | 12/1985 | Erdman | 318/254 |
| 4,565,957 | 1/1986 | Gary et al. | 318/722 |
| 4,641,066 | 2/1987 | Nagata et al. | 318/254 |
| 4,642,536 | 2/1987 | Boyd, Jr. et al. | 318/254 |
| 4,642,537 | 2/1987 | Young | 318/254 |
| 4,654,566 | 3/1987 | Erdman | 318/254 |
| 4,743,815 | 5/1988 | Gee et al. | 318/254 |
| 4,752,724 | 7/1988 | Rodziwill et al. | 318/254 |
| 4,763,347 | 8/1988 | Erdman | 318/254 |

(List continued on next page.)

FOREIGN PATENT DOCUMENTS 2057992 6/1992 Canada .

OTHER PUBLICATIONS

"An Approach to Position Sensorless Drive For Brushless DC Motor", by Ogasawara and Akagi–IEEE Transactions on Industry Applications, vol. 27 No. 5 Sep./Oct. 1991.
"High-Efficiency Drive Due to Power Factor Control of a permanent Magnet Synchronous Motor"; by Nakamura et al. IEEE Transactions 1992.
"An Efficiency Optimizing Permanent Magnet Synchronous Motor Drive"; Colby et al. 1987.
"Four-Quandrant Brushless ECM Drive"; Becerra et al. IEEE Transations 1991.

Primary Examiner—William M. Shoop, Jr.
Assistant Examiner—John W. Cabeca
Attorney, Agent, or Firm—Polster, Lieder, Woodruff & Lucchesi

[57] ABSTRACT

A dynamoelectric machine, for example, a brushless permanent magnet motor (M) has a plurality of stator windings (S) and a rotor (T) which rotates with respect to the windings. Apparatus (10) is provided for controlling winding commutation with respect to the rotor. A DC bus (14) supplies current to the windings. The current waveshape has characteristics which are a function of the commutation angle with respect to the windings. Current magnitude and waveshape are sensed by a sensing unit (22) and the sensed waveshape is sampled to obtain commutation information. An inverter (20) successively energizes and de-energizes the respective stator windings. A controller (26) obtains samples of the waveshape, and processes the information obtained by the sampling to control winding commutation. The controller controls the inverter operation to provide a commutation angle which optimizes motor performance and efficiency for a particular set of motor operating conditions. To do this, the processor evaluates slope and amplitude information from the sampled DC bus current waveshape, determines if the waveshape corresponds to a desired waveshape representing a desired commutation angle, and adjusts the commutation frequency produced by the inverter, if necessary, to obtain the desired waveshape.

38 Claims, 6 Drawing Sheets

U.S. PATENT DOCUMENTS

| | | | |
|---|---|---|---|
| 4,813,248 | 3/1989 | Smith et al. | 68/23 |
| 4,835,839 | 6/1989 | Forbes et al. | 29/256 |
| 4,876,491 | 10/1989 | Squires et al. | 318/138 |
| 4,912,378 | 3/1990 | Uukosavic | 318/254 |
| 4,928,043 | 5/1990 | Plunkett | 318/254 |
| 4,978,895 | 12/1990 | Schwartz | 318/254 |
| 4,978,896 | 12/1990 | Shah | 318/254 |
| 5,019,756 | 5/1991 | Schwartz | 318/254 |
| 5,028,852 | 7/1991 | Dunfield | 318/254 |
| 5,198,972 | 3/1993 | Cafuze | 363/138 |
| 5,241,254 | 8/1993 | Offringa et al. | 318/809 |

BUS CURRENT.

MAIN LOOP.

SUB – LOOP.

SUB-LOOP

METHOD AND APPARATUS OF OPERATING A DYNAMOELECTRIC MACHINE USING DC BUS CURRENT PROFILE

BACKGROUND OF THE INVENTION

This invention relates to dynamoelectric machines and, more particularly, to determining commutation information for a motor using the DC bus current profile. This profile includes both the current's amplitude and waveshape. While the invention is primarily for use with brushless permanent magnet motors and switched reluctance motors, those skilled in the art will appreciate the wider applicability of the invention for use with other types of motors.

Brushless permanent magnet DC motors, also known as BPM or BLDC motors, require that currentflow through their stator windings be commutated so a desired phase relationship is maintained with respect to the rotor position at any given instant. This commutation is accomplished using an inverter. For most efficient motor operation, it is desirable to commutate the motor at relatively precise moments. This requires the inverter be operated so its switching "on" and "off" of voltage or current to the windings is a function of the position of the rotor. The rotor position with respect to a phase winding, when the winding is energized, is known in the art as the commutation angle. For commutation control purposes, sensors such as Hall effect sensors, or magnetic or optical encoders have been used with motors to sense the rotor's instantaneous position. However, these sensors add to the cost of the motor not only because of their unit cost, but also because of the additional wiring required between the motor and inverter. Sometimes space limitations or environmental factors make it impractical to use these sensors. In such instances, indirect or "sensorless" techniques are employed. Examples of these techniques are disclosed in U.S. Pat. Nos. 4,928,043 to Plunkett, 4,912,378 to Vukosavic, 4,459,519 to Erdman, 4,491,772 to Bitting, 4,743,815 to Gee et al., 4,169,990 also to Erdman (misspelled Lerdman on the face of the patent), and 4,162,435 to Wright. In addition to these patents, we are also aware of the paper by Colby and Novotny on optimizing the efficiency of brushless permanent magnet drives using an open loop system, entitled *An Efficiency Optimizing Permanent Magnet Synchronous Motor Drive*, Roy S. Colby and Donald W. Novotny, Department of Electrical and Computer Engineering, University of Wisconsin-Madison, 1987; and the paper by Nakamura et al., *High-Efficiency Drive Due To Power Factor Control Of A Permanent Magnet Synchronous Motor*, Y. Nakamura, T. Kudou, F. Ishibashi, and S. Hibino, IEEE Transactions, 1992.

In Plunkett, a brushless DC permanent magnet motor has an associated feedback loop between its stator windings and an inverter. A timer is used to supply current to the stator windings in a controlled sequence. For commutation purposes, the back EMF (BEMF) of an unenergized winding is sensed and compared with a predetermined value (null point). To maximize motor torque, the switching time of the inverter is controlled by the output of a voltage controlled oscillator (VCO). The VCO is responsive to the difference between amplitude of the BEMF and an optimum amplitude to adjust its output to the inverter. In addition to the added circuitry required by this system, it does not have the flexibility of, for example, a microprocessor based system.

The Vukosavic patent, which is assigned to the same assignee as the present application, discloses a system for determining rotor position also using BEMF. The system uses the third harmonic of BEMF, and obtains this by summing the terminal voltages of the motor. The rotor position is a function of the phase angle of the third harmonic, and commutation is accomplished by switching on current or voltage to a non-energized winding in response to the phase angle reaching a predetermined angle. A microcontroller is usable for this purpose; or, a phase locked loop can also be used. An advantage of this approach is that the third harmonic signal is essentially free of distortions caused by inverter switchings. However, the system requires access to the motor's neutral connection and its operation is an open loop operation during motor starting.

Gee at al., which is also assigned to the same assignee as the present application, describes a control system for a brushless permanent magnet motor. A microprocessor is responsive to zero crossings of motor BEMF to control commutation of the multi-phase motor. Signals are periodically generated indicating the relative position of the rotor relative to the stator. Whenever the rotor position is determined to be at one of a plurality of positions relative to the stator (zero crossing points), an interrupt signal is generated. The microprocessor is responsive to these interrupts to activate switches, thereby permitting current to flow through the respective phase windings. Although the control system is a closed loop system, motor operation must initially be open loop until the motor reaches a predetermined speed.

The Erdman '990 patent teaches a brushless DC motor in which a detecting circuit is used to sense motor BEMF. The detecting circuit integrates the BEMF of the unenergized winding to produce a commutation signal. Commutation signals are produced whenever the integrated signal exceeds a predetermined reference signal, representing rotor position, with which it is compared. The detecting circuit must reset after every comparison. The simulated rotor position signal is referenced to a stationary armature and a predetermined angle of advancement is maintained. A power circuit responds to the derived signal to control application of current to the motor's windings. One problem with this approach is the amount of circuitry required for BEMF detection, integration, current application control, and reset. Another is the inability of this circuitry to control motor operation until it is operating at some minimum speed where the measured BEMF is sufficient to permit the circuitry to function effectively.

In Wright, one winding of the motor is energized. The voltage across a second winding is then sampled and integrated in a manner similar to that in the Erdman '990 patent discussed above. This provides a flux indication which is then compared to a reference value. When the integrated value exceeds the reference value, the next motor winding is energized. The integrated value is simultaneously reset to zero and another cycle of sampling commences. Although measuring the BEMF across the unenergized winding does yield an indication of rotor position, this approach has certain drawbacks. For example, extensive hardware is needed to implement the sampling and integration scheme. Also, there must be an open loop start-up and ramp-up to a minimum operating speed before there is sufficient BEMF signal for the scheme to work. The Erdman U.S. Pat. No. 4,459,519 and Bitting U.S. Pat. No. 4,491,772 patents also disclose integration techniques.

In their paper, Colby and Novotny describe improvements in open loop operations of a brushless DC motor. Besides being open loop, their improvements do not include use of DC current information for control purposes as described hereinafter.

The commutation approach described by Nakamura et al. in their paper referred to above attempts to control the power factor of a motor rather than commutation angle. The circuitry described in this paper includes a sample and hold circuit and measures the difference in amplitude of the DC bus current immediately before, and immediately after, the commutations. To achieve maximum power factor, the circuit attempts to minimize the measured current difference $\Delta I_{DC}$. It does this by changing the pulse width modulation (PWM) voltage applied to the motor.

Other approaches in sensorless operations include diode conduction and winding inductance. Diode conduction involves detecting current flow during an open phase interval (approximately 60°) of the motor line current waveform. The current flow is caused by the BEMF in the open phase and, if the rotor is aligned properly, starts at the midpoint of the phase (approximately 30°). Motor line current sensors can directly sense this conduction; or, the conduction can be indirectly sensed using free-wheeling diodes. This approach is described in *An Approach to Position Sensorless Drive for Brushless dc Motors*, by Satoshi Ogasawara and Hirofumi Akagi, IEEE Transactions on Industry Applications, Vol. 27, No. 5, September/October 1991.

The winding inductance approach is premised on the rotor's position being inferred by determining which of a number of windings has the lowest inductance at a given time. High frequency signals are injected into an unenergized winding and resulting peaks are then measured. This approach is shown, for example, in U.S. Pat. Nos. 5,028,852 to Dunfield, and 4,876,491 to Squires et al.

SUMMARY OF THE INVENTION

It is an object of the present invention to provide a dynamoelectric machine, for example, a brushless permanent magnet motor, switched reluctance motor, etc., in which commutation is accomplished using an inverter. For this purpose, the profile of DC bus current is sensed (i.e., amplitude and waveshape) and this information is used to control commutation provided by the inverter.

A further object of the invention is to obtain the rotor position information from the inverter's DC bus current waveshape. Commonly, current flowing through the inverter is sensed both for control purposes and to protect the inverter. Current detection and resulting commutation is therefore accomplished using existing components utilized in the motor drive.

Another object of the invention is to adjust the phase or commutation angle automatically. Such adjustments are needed when the operating conditions of the motor change, for example, when the motor is required to operate at a higher speed; or, because the motor's characteristics change over time; or, from differences in the electronic components associated with the motor, from variations in input power, and/or from variations in output load, etc.

Yet another object of the invention is to provide controlled commutation of the motor over substantially the entire speed range of the motor, including starting. This differs from certain prior art approaches described above, where motor operating speed must reach a minimum level before a closed loop or sensorless control scheme is effectively implemented.

A further object of the invention is to provide a commutation approach especially suitable for permanent magnet motors used in variable speed applications. Regardless of the application, however, use of the commutation approach of the present invention allows the motor to operate at optimal efficiency over the entire speed range of the motor.

In accordance with the invention, generally stated, a dynamoelectric machine such as a brushless permanent magnet motor includes a stationary assembly having a plurality of associated stator windings and a rotor mounted for rotation with respect to the windings. Apparatus is provided for determining a commutation angle of the windings with respect to the rotor. A power supply supplies current to the windings though an inverter and the current waveform has amplitude and waveshape characteristics which are useful in adjusting the commutation angle when the rotor position with respect to the stator windings is not of a desired phase. The current waveshape is sampled to obtain amplitude and slope information. A commutator successively energizes and de-energizes the respective stator windings. A processor is responsive to the amplitude and slope information to control commutation. The processor determines whether commutation produces a desired phase angle relationship between the windings and the rotor. If the relationship is not as desired, the processor determines if the commutation angle is leading or lagging. Based on this determination, the processor operates to align winding commutations optimally with rotor position for the current motor operating conditions. Such alignment optimizes the efficiency of motor operation. A method of commutation control is also described. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figures 2A, 2B:
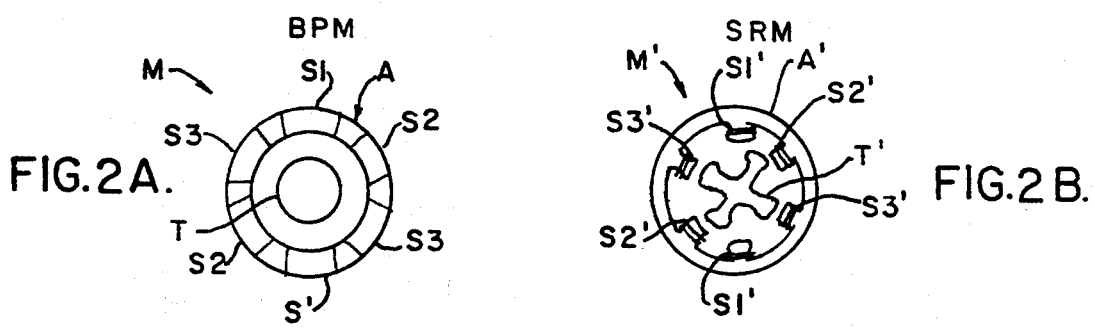
FIG. 2A is a representation of a brushless permanent magnet motor.
FIG. 2B is a representation of a switched reluctance motor.

Referring to the drawings, a brushless permanent magnet (BPM) motor M is illustratively shown as a three phase motor in FIG. 2A. Brushless permanent magnet motors are well-known in the art, and the construction of motor M will therefore not be described in detail. As shown in FIG. 2A, motor M has a stator assembly A including stator windings S1–S3. A rotor T is mounted for rotation within the stator assembly. A brushless permanent magnet motor with a combined end shield and heat sink with which the present invention is used is described in copending U.S. patent application Ser. No. 07/796,331, the disclosure of which is incorporated herein by reference. This application is assigned to the same assignee as the present application.

Referring to FIG. 2B, a switch reluctance (SRM) motor M' is shown. Motor M' is also a three phase motor and the rotor T' stator assembly A' and windings S1'–S3' are shown. In the discussion which follows, it will be understood that the apparatus and method of the invention work with both of these motors, as well as with other types of motors and other motor constructions.

Motors M and M' are commutated motors. This means their stator windings are successively energized and de-energized as their rotors turn. For efficiency of motor operation, it is important to sense continuously the alignment of the stator windings relative to the position of the rotor, and effect commutation as a function of such sensed relative alignment, or commutation angle. In accordance with the present invention, an apparatus 10 (see FIG. 1) is useful in determining an appropriate commutation angle and using the information obtained by the apparatus to provide effective commutation control.

Apparatus 10 includes a power supply means 12 for supplying current to the motor windings. Means 12 includes a DC bus 14 for supplying power over an output line 16a to the motor, and a return line 16b from the motor. Bus 14 may be preceded by an AC/DC converter such as a full wave rectifier bridge 17 connected to an alternating current source on its input side and to a DC bus capacitor (not shown) on its output side. The capacitor is used to smooth out any AC ripple superimposed on the DC voltage produced by the AC/DC converter, thereby providing a relatively smooth, constant value DC voltage at the output side of the bus capacitor. The voltage across the DC bus provides a polarized positive pulse voltage to the line 16a, while line 16b provides the negative return. A commutation means 18 is interposed in the power lines between the bus and the motor. Means 18 includes an inverter 20 by which each stator winding is successively energized and de-energized to implement the commutation means function.

Figures 3A, 3B:
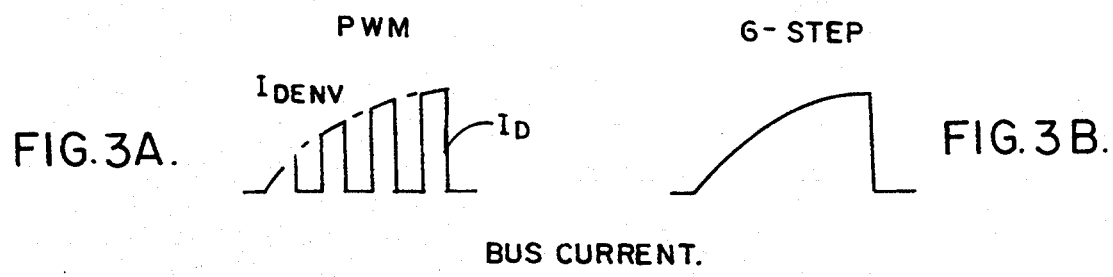
FIGS. 3A and 3B are respective representative DC bus current waveshapes for a pulse width modulated (PWM) inverter and a six-step inverter both of which are usable with the apparatus.

Referring to FIGS. 3A and 3B, inverter 20 is typically either a PWM inverter, or what is commonly referred to as a six-step inverter. Because both types of inverter are well-known in the art, neither will be described in detail. However, it will be appreciated that the current in the return side 16b of FIG. 1, or on the return side of any particular leg of inverter 18 has a waveshape the relative characteristics of which are a function of stator winding commutation relative to rotor position. FIG. 3A illustrates the waveshape of the DC bus current which is obtained from a PWM type inverter; while FIG. 3B illustrates that obtained from a six-step type inverter. As is readily seen in FIGS. 3A and 3B, the waveshape envelopes generally correspond to one another. It will be appreciated that one of these waveshapes is the input to the respective motor phases of motor M, depending on the inverter design chosen.

Figure 4:
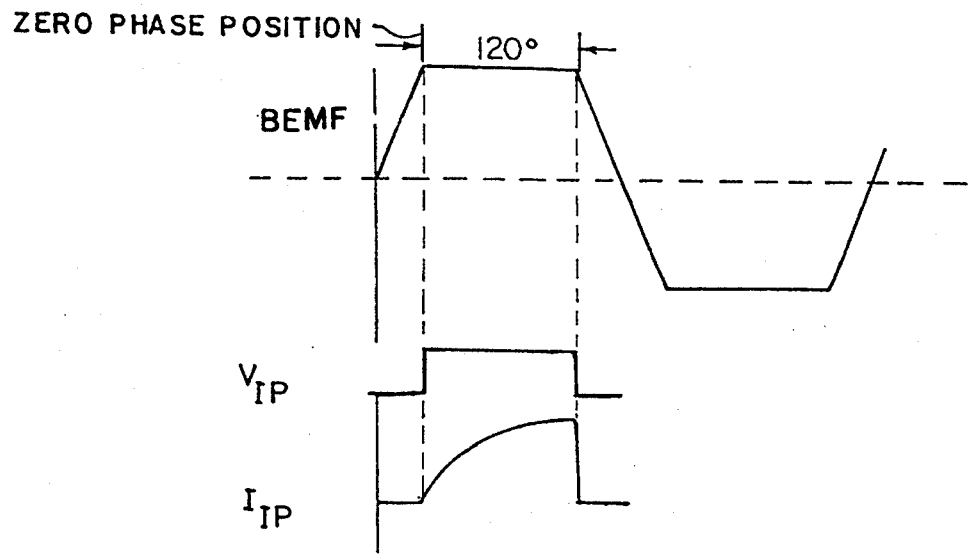
FIG. 4 illustrates the relationship between the motor's BEMF, applied voltage, and the resultant current.
Figure 5:
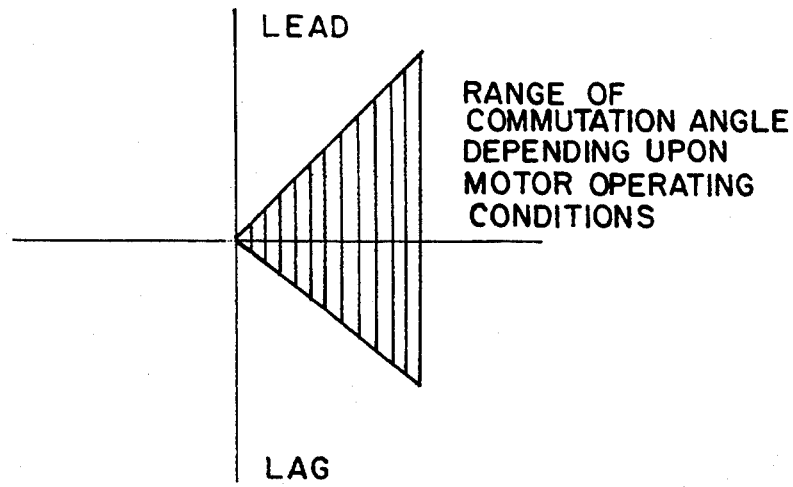
FIG. 5 graphically illustrates a range of desired phase angles for different motor operating conditions.

For any motor operating condition, one of three commutation relationships between the stator windings and the rotor is present. The commutation either has a desired phase angle with respect to the rotor, or the commutation angle lags or leads the rotor. The motor return current waveshape or profile reflects that relationship. Accordingly, as shown in FIG. 4, an idealized curve of motor BEMF for a stator winding of motor M is illustrated, together with the relative portions of the applied voltage and resultant current waveshapes. In general, maximum torque for a particular set of motor operating conditions occurs when voltage applied across a winding, and the resulting current, is "in phase" with the peak BEMF. The term "in phase" does not mean there is zero phase shift between the start of commutation and the peak or flat topped portion of the BEMF curve in FIG. 4. As a practical matter, optimal operating conditions occur when the phase advance is sufficient to permit the current to reach its peak value at the instant when the BEMF flat-top occurs. In actuality, this occurs when commutation leads BEMF, particularly at higher motor operating speeds. The commutation angle varies considerably (as seen in FIG. 5) and depends on a variety of motor operating conditions. Rather, "in phase" is meant to imply that once a relationship for optimal operation is established for a set of conditions, it is maintained so long as as that set of conditions persist. When the conditions change, a new "in phase" relationship will be established and maintained.

In FIG. 5, lagging and leading rotor conditions are shown on the vertical axis of the graph. The "in-phase" condition lies somewhere between the two, and falls within the shaded area. Where within this range "in-phase" operation of the motor occurs depends, as noted, upon the overall motor operating conditions at any given time. These conditions include, for example, input power to the motor, the output load on the motor, changes which occur over time in the motor, and the electronics used with the motor for various purposes.

Figure 6A:
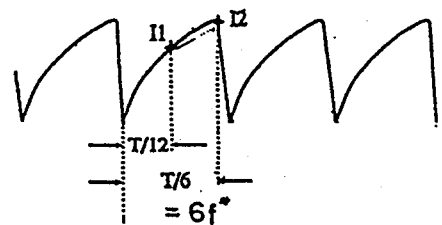
FIGS. 6A–6C are representative current profiles of DC bus current as a function of commutation angle, each profile showing both the current waveshape for a particular commutation relationship as well as sampling of the waveshape to obtain amplitude and slope information.
Figure 6B:
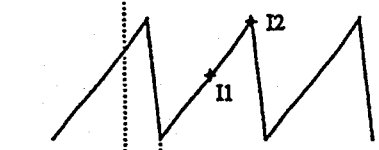
Figure 6C:
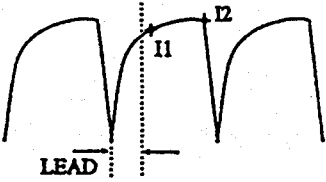

As shown in FIG. 6A–6C, the current profile for the DC bus current is indicative of the degree to which commutation is "in phase" or not. Thus, in FIG. 6A, the current profile, i.e., the current amplitude and waveshape, are indicative of an "in phase" commutation condition. In FIG. 6B, commutation lags the rotor. For this condition, current first increases slowly, but then rises sharply as the opposing BEMF drops. In FIG. 6C, commutation leads the rotor. For this condition, current first rises sharply, then levels off as the opposing BEMF increases to its maximum value.

In accordance with the present invention, apparatus 10 employs a closed loop arrangement which samples the DC current profile to ascertain which of the three is present. If the profile corresponds to the desired profile for a given set of operating conditions, i.e., the profile of FIG. 6A, no adjustment is made by the apparatus. If, however, the profile corresponds to that of FIG. 6B or 6C, the apparatus acts to adjust commutation to bring it "in phase". In doing so, the current profile is transformed to that of FIG. 6A.

Figure 1:
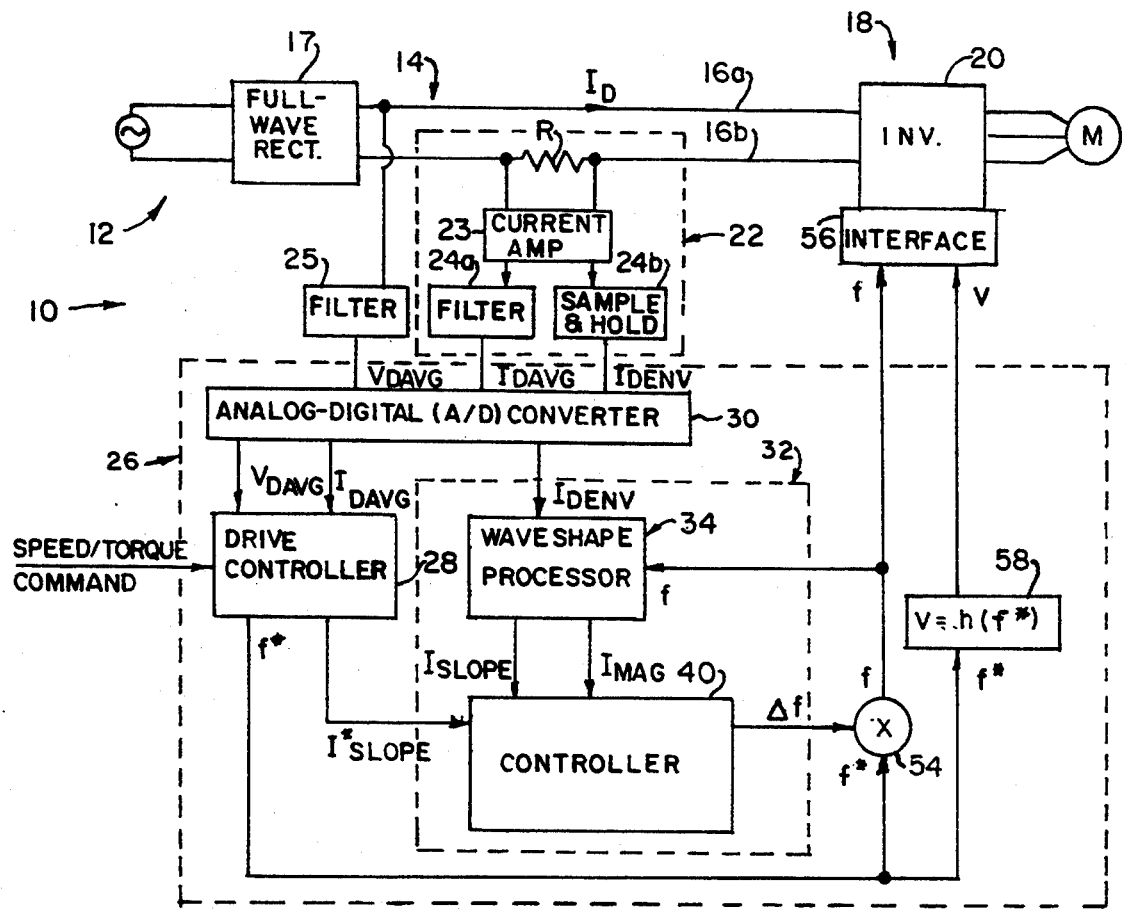
FIG. 1 is a schematic block diagram of one illustrative embodiment of apparatus of the present invention for commutating a dynamoelectric machine.

Apparatus 10 includes a current sensing means 22 as seen in FIG. 1. The sensing means may be implemented by a resistance R serially connected in line 16b and across which the waveshape is developed. It will be understood that other current sensing means, including direct current sensing, may also be used. Sensing means 22 also includes an amplifier 23 for amplifying the sensed current signal. The amplifier provides a parallel output. One output is to a filter 24a, and the other output is to a sample-and-hold circuit 24b. Filter 24a produces an average DC bus current signal $I_{DAVG}$. Circuit 24b, which is used with a PWM inverter, generates a DC bus current envelope signal $I_{DENV}$. This latter signal is subsequently used for detecting the bus current waveshape. In addition to sensing means 22, a voltage sensing and filtering circuit 25 is connected to bus line 16a and produces an output signal $V_{DAVG}$.

Next, apparatus 10 includes a processor means 26. Means 26 includes a drive controller 28 and an analog-to-digital converter 30. Converter 30 is responsive to the output signals provided by sensing means 22 and filter circuit 25 to convert the respective current and voltage signals to a continuum of digital values. The digital values corresponding to $V_{DAVG}$ and $I_{DAVG}$ are provided as inputs to drive controller 28 which performs the overall function of controlling speed/torque of the motor. Controller 28 determines a desired inverter 20 frequency f* based on a speed/torque input command to the controller, and motor operating conditions. Frequency f* is related to a base value of the commutation interval. For a three-phase motor, the base value of this interval is T*/6. The relationship between this value and the desired motor frequency f* is T*/6=1/(6f*).

Apparatus 10 also includes a commutation angle controller 32. The digital values corresponding to $I_{DENV}$ are supplied to controller 32 which uses these values to detect the amplitude and waveshape of the current envelope. The output of controller 32 is used to adjust the commutation angle, if adjustment is required, to effect the desired "in phase" relationship previously discussed. Controller 32 uses the base commutation interval value T*/6 and the DC bus current attributes of amplitude and waveshape to continuously determine the actual commutation interval T/6. It does this to insure the motor windings are properly aligned relative to the rotor position. Accordingly, drive controller 28 and commutation angle controller 32 together maintain synchronism of commutation relative to the rotor, and optimal motor operation, even if the operating conditions of the motor change.

Figure 7:
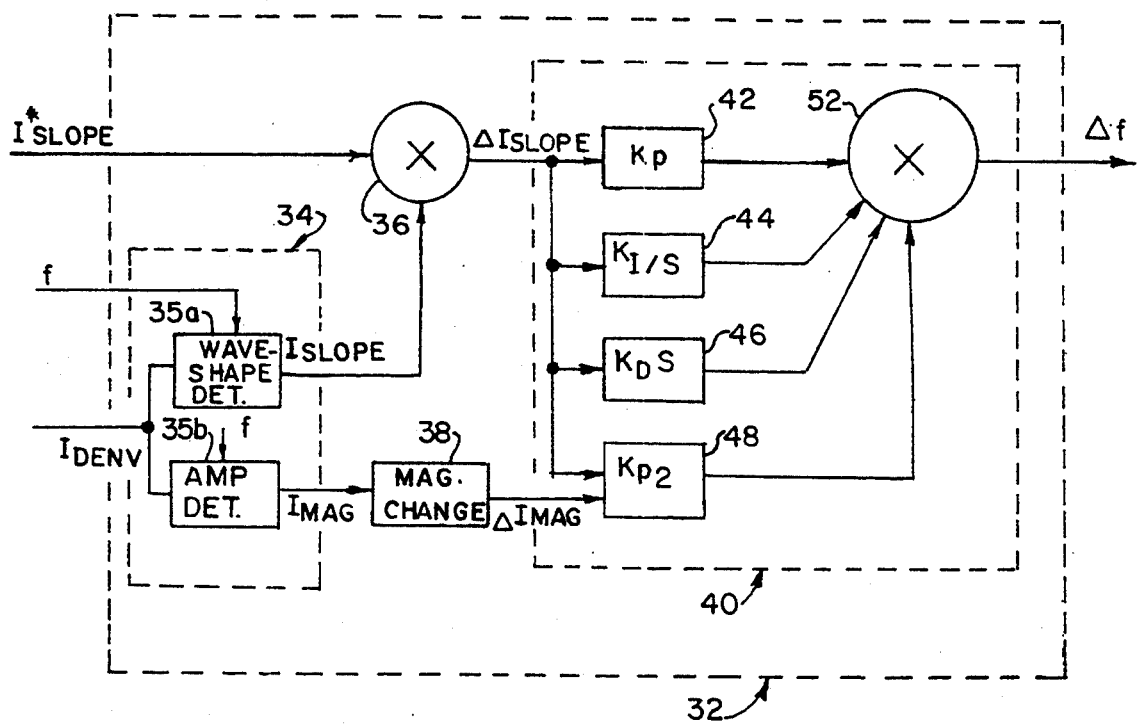
FIG. 7 is a block diagram of a commutation angle controller of the present invention.

Controller 32 is shown in FIG. 7 to include a waveshape processor 34 which uses digital samples of the current envelope $I_{DENV}$. It is a feature of the present invention that waveshape processing means 34 uses multiple samples of the DC bus current waveshape for each commutation interval. The number of samples used is determined by the precision desired, and the processing capabilities of the apparatus. At a minimum, at least two samples per interval are used. Referring to FIGS. 6A–6C, for the commutation interval T/6, two data samples I1 and I2 are respectively taken. Data sample I1 is taken at time T/12, or halfway through the interval. The other data sample I2 is taken at T/6, the end of the interval. The actual motor frequency f is used to determine the intervals T/12 and T/6.

Waveshape processor means 34 includes a waveshape detector 35a, and an amplitude detector 35b. The digitized current envelope $I_{DENV}$ is provided as an input to each. From the samples input to means 34, information concerning the shape of the current envelope or waveform is determined. This information is processed by waveform detector 35a to ascertain the slope of the current envelope; and by amplitude detector 35b to ascertain the magnitude of the envelope. Based upon data samples I1 and I2, the following mathematical relationships pertain when commutation is "in phase":

$$I2/I1 = A,$$

and $$I1 + I2 = B;$$

where A represents a ratio of the current values at the times when they are taken, and B represents their sum.

These relationships are used to derive commutation angle information as follows:

If commutation lags the rotor as shown in FIG. 6B, then $$I2/I1 > A,$$

and $$I1 + I2 \geq B.$$

Similarly, if commutation leads the rotor as shown in FIG. 6C, then $$I2/I1 < A,$$

and $$I1 + I2 \geq B.$$

Because the ratio of I2/I1 provides a clear indication of whether or not commutation is in-phase, lagging, or leading, waveshape detector 35a provides an output $I_{SLOPE}$ which represents I2/I1. Similarly, amplitude detector 35b provides an output $I_{MAG}$ which represents I1+I2. Again, it will be understood that while waveshape processor means 34 uses two samples per interval, a greater number of samples per interval could be processed, if desired. Such a sampling strategy produces greater definition of the DC bus current waveshape. However, adequate definition is provided using only the two samples I1 and I2. Also, while the slope value I2/I1 is the important factor for control purposes, the magnitude value I1+I2 enhances control by the apparatus.

Referring again to FIG. 7, waveshape processor means 34 provides the $I_{SLOPE}$ output of waveshape detector 35a to a summing point or adder 36. A second input to the summing point is a desired slope value $I^*_{SLOPE}$. The output from the summing point is a difference signal $\Delta I_{SLOPE}$ value. The $I_{MAG}$ output of amplitude detector 35b is supplied to a module 38 which compares the change in waveform magnitude and produces an output $\Delta I_{MAG}$.

If $I_{SLOPE}$ from waveshape processing means 34 equals the desired slope, the output from summer 36 is zero. This means the commutation is "in-phase". Otherwise, the difference, $\Delta I_{SLOPE}$ means a lagging or leading condition exists. If $I^*_{SLOPE} - I_{SLOPE} > 0$, the commutation needs to be delayed; i.e., T/6 needs to be increased. Correspondingly, if $I^*_{SLOPE} - I_{SLOPE} < 0$, the commutation needs to be advanced; i.e., T/6 needs to be shortened. Similarly, if there is no change in the $I_{MAG}$ value supplied to module 38, the resulting $\Delta I_{MAG}$ value is also zero. If the value is other than zero, it is indicative of a lagging or leading commutation angle.

The $\Delta I_{SLOPE}$ output from summing point 36 is provided to a control means 40. The control means, whose operation is well-known in the art, is responsive to this value, and to the $\Delta I_{MAG}$ value from module 38, to determine a commutation interval correction $\Delta T/6$, and a corresponding frequency correction $\Delta f$, which, when applied to the motor through operation of inverter 20 will drive the commutation angle back to an "in phase" condition. If the value of $\Delta I_{SLOPE}$ is already zero (the "in phase" commutation condition already exists) there is no interval or frequency correction.

The slope error value $\Delta I_{SLOPE}$ is simultaneously applied to a proportional control block 42, an integral control block 44, and a derivative control block 46. Each block has an associated gain constant $K_P$, $K_I$, and $K_D$ respectively. The values assigned to the constants are a function of the motor design and its operating characteristics. The $\Delta I_{SLOPE}$ value is also supplied to a second proportional control block 48, to which the $\Delta I_{MAG}$ value is also supplied. Block 48 has an associated gain constant $K_{P2}$ whose value is also a function of motor design and operating characteristics. The output of the respective proportional control blocks 42 and 48, integral block 44 and derivative block 46 is supplied to a summing point or adder 52. The output from the summing point 52 is the commutation interval change and corresponding frequency correction $\Delta f$ required to modify interval T/6 and return the commutation angle back to its "in phase" condition.

Referring again to FIG. 1, the f value from control means 40 is applied to a summing point 54 where it is additively combined with the desired frequency f, which is supplied by drive controller 28. The resultant output from the summing point 54 is the actual frequency signal $f = f^* + \Delta f$ which is supplied to an interface 56 of inverter 20. Interface 56 converts this input to signals which control the commutation period for the respective phase windings of motor M. By adjusting the interval in accordance with the calculated adjustment factor $\Delta f$, the commutation angle, if not already "in phase" is driven toward this condition. Drive controller 28 also supplies the desired frequency f* to a voltage means 58 as well as to summing point 54. Means 58 produces a voltage input V for the inverter whose value is a function of the desired motor speed. This voltage input is supplied as a second input to inverter interface 56.

As a result of this operation of apparatus 10 and the method of the invention, an "in phase" commutation angle is readily achieved. In addition, a number of other important results are also achieved. First, commutation angle control is effected without need of any type of rotor position sensor such as Hall effect, optical encoders, magnetic sensors, or other types of sensors. Indeed, rotor position information is not required at all by the apparatus to perform its commutation angle control function. Further, commutation angle control is achieved without utilizing BEMF. This is unlike the methods required in other commutation schemes. Also, the closed loop control methodology of the present invention allows commutation control for motor M throughout its full operating range; e.g. from start-up through its maximum speed. This significantly differs from prior control methods which, even though they may have closed loop operation at some point, require open loop operation until the motor is substantially at its nominal operating speed.

Figure 8:
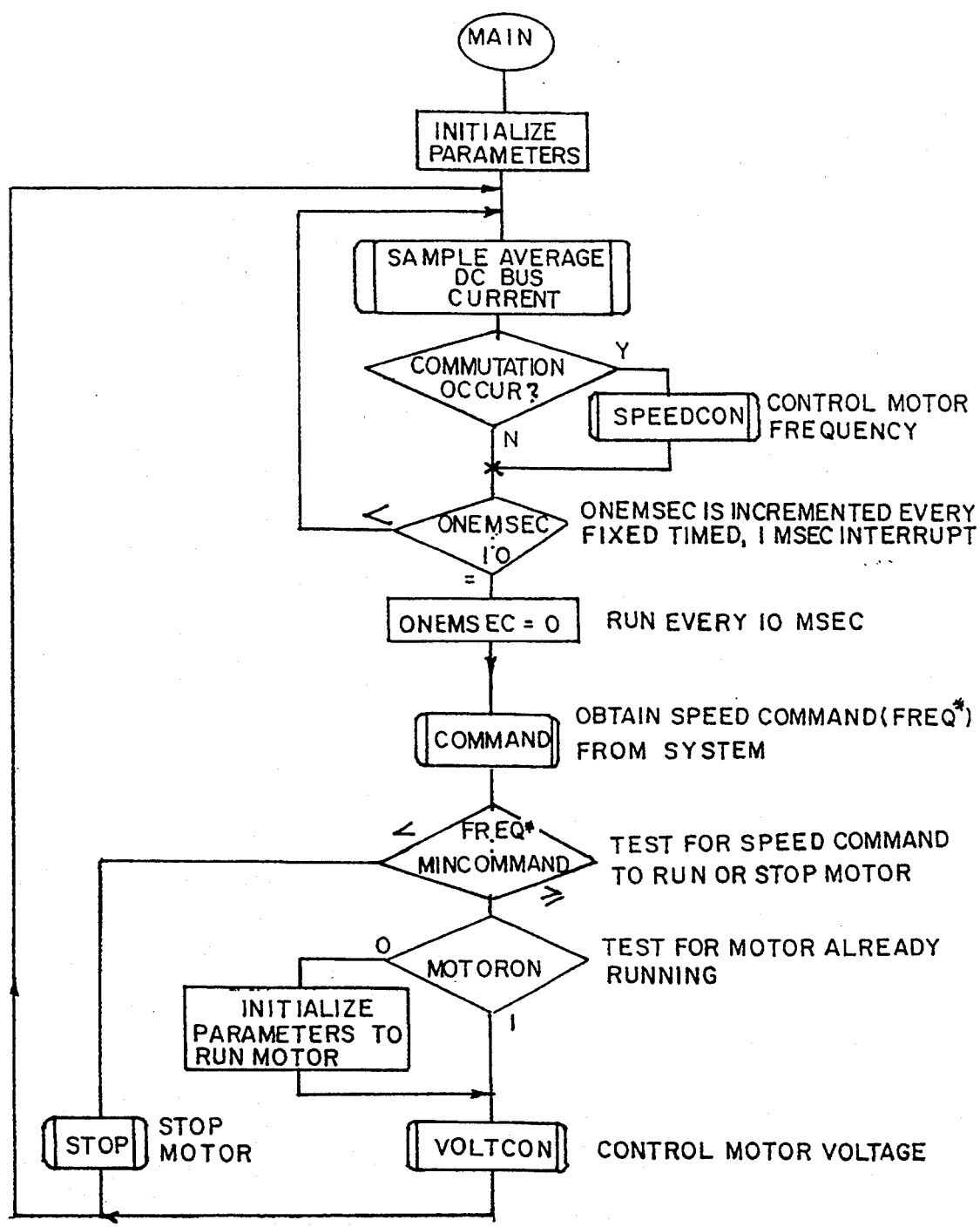
FIG. 8 is a flow chart of the main loop of a microcontroller algorithm for commutation and overall control of a motor using the sensed DC bus current waveshape.

Referring to FIG. 8, the method by which the strategy of apparatus 10 for controlling commutation angle and the overall control of motor M is implemented is shown on a flow chart. As represented therein, a main program for performing the method first involves establishing the value of certain parameters. These relate to the type of environment in which the motor operates, expected loads, available power, commutation frequencies for different motor operating conditions, etc. After these are established, apparatus 10 sequentially samples average DC bus current, determines when a commutation interval nominally starts and stops, performs the commutation angle evaluation described above using the information obtained from the DC bus current waveshape sampling, checks to determine if the motor is to continue running or is stopped, performs a voltage control function as described hereinafter, and then repeats the process.

Figure 9:
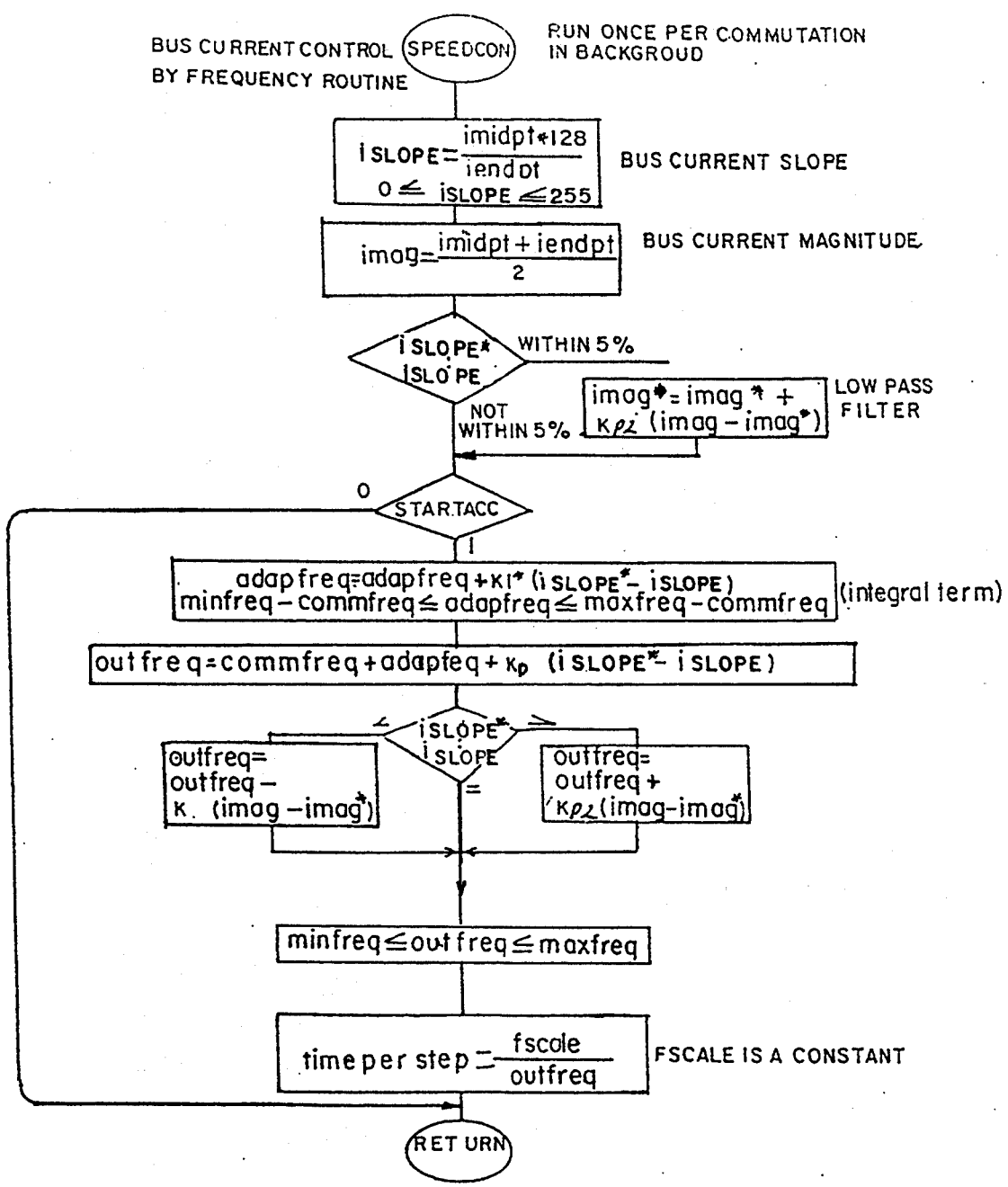
FIG. 9 is a flow chart of a sub-loop (SPEEDCON) of the main loop.

FIG. 9 is a flowchart illustrating the steps performed to control commutation angle based on DC bus current waveshape sampling. The steps shown in FIG. 9 comprise a subroutine denominated as "SPEEDCON" of the method shown in FIG. 8. As indicated in FIG. 8, current samples are taken at the mid-points and end points of a commutation interval. As noted above, although only two samples are taken of the envelope, more samples can be taken, if desired. Also, it is not necessary that the two samples be taken at the mid and end points. Processing of information from the samples, their comparison with desired values for the particular operating conditions of the motor at a given time, generation of a difference between the actual and preferred values, and the development of a correction to adjust the commutation angle period so the desired "in phase" relationship is achieved corresponding to the operations described above with respect to FIGS. 1, 6A–6C, and 7.

Figure 10:
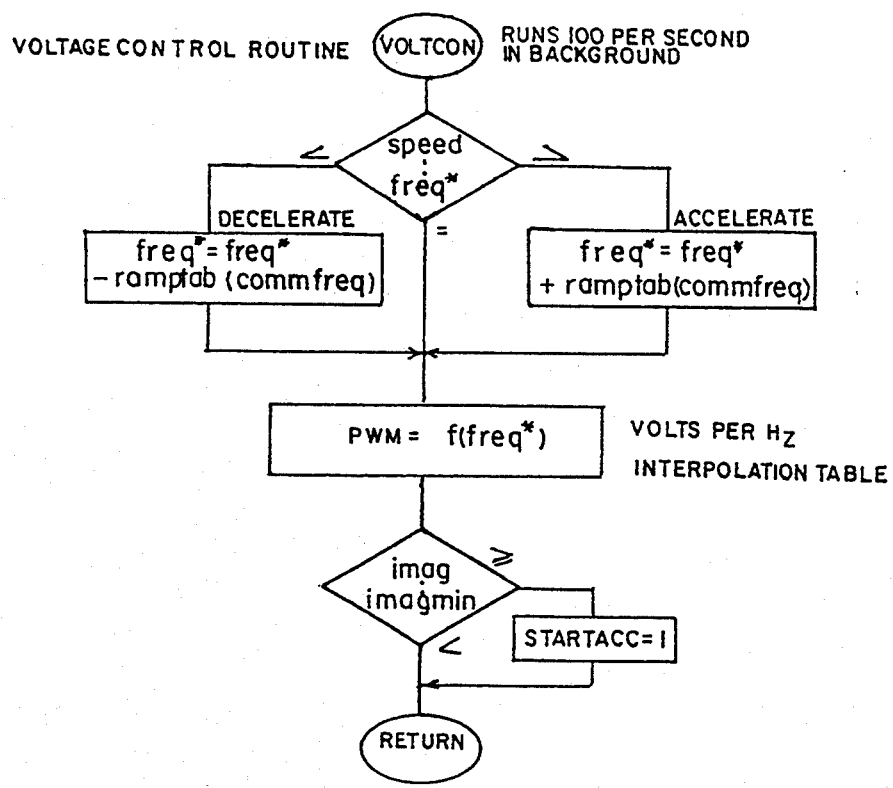
FIG. 10 is a flow chart of another sub-loop (VOLTCON) of the main loop.

FIG. 10 illustrates the flowchart of a second sub-routine, denominated as "VOLTCON" in FIG. 8, by which a desired operating frequency f* is established. Once the frequency f* is established, the voltage is set accordingly. As shown in FIG. 10, the flowchart describes operation for a PWM inverter 20; although it will be understood that a corresponding flowchart for a six-step inverter could also be implemented.

Figure 11:
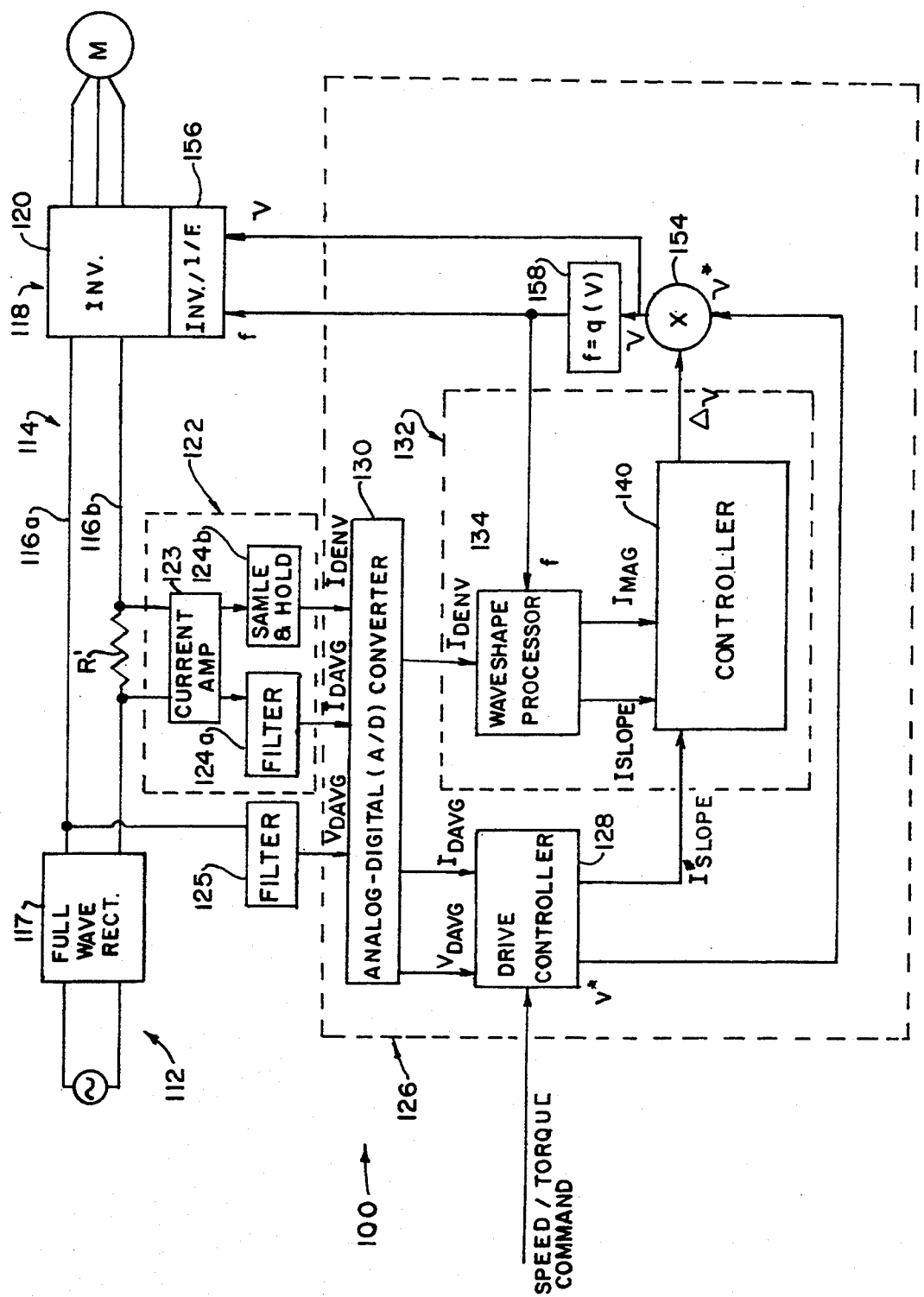
FIG. 11 is a block diagram of an alternate embodiment of the apparatus.

A second embodiment of the apparatus of the present invention is indicated generally 100 in FIG. 11. Corresponding components to the first embodiment have reference numerals incremented by one hundred, where appropriate. Apparatus 100 also controls commutation of the three-phase brushless permanent magnet motor M or switched reluctance motor M'. DC bus 114 is connected to the motor through an inverter 120 which is either a PWM or six-step inverter by which commutation is performed. A sensing unit 122 senses the current waveshape. Sensing unit 122 includes a resistance R' and an amplifier 124. A control means 126 is responsive to the sensing unit 122 output and includes a drive controller 128, analog-to-digital converter 130 and controller 132. Controller 132 includes waveshape processor means 134, and control means 140. As before, control means 126 takes and evaluates two DC bus current waveshape samples during each commutation interval to determine if the commutation angle is "in phase" or leading or lagging.

The difference between apparatus 10 and apparatus 100 is that drive controller 128, instead of supplying a desired frequency output f*, supplies a desired motor voltage output V* to summing point 154. In addition, control means 140, now produces a voltage based correction factor V instead of the frequency based correction factor $\Delta f$. Summing point 154 produces a desired motor output voltage $V = V^* + \Delta V$. This voltage value is supplied both to a frequency-voltage conversion means 158 and to the voltage input of inverter interface 156. Conversion means 158 generates a desired frequency value f as a function of the output voltage value V from the summing point. The frequency value f produced by means 158 is supplied both to waveshape processor means 134, and to inverter interface 156. As is seen, the operation of apparatus 100; while obtaining the same commutation angle control as apparatus 10, does so using a voltage rather frequency base. While the processing of the waveshape envelope and motor voltage information differs from that of apparatus 10, apparatus 100 nevertheless provides the same degree of control. While not shown, it will be understood that flow charts similar to those of FIGS. 8–10 could be developed for apparatus 100.

In summary, a brushless permanent magnet motor or switched reluctance motor arrangement has been described in which commutation angle control is accomplished. This is done by sampling the DC bus current waveshape at predetermined points during each commutation interval. The apparatus is responsive to the sampling information to adjust the commutation angle if it is found to be leading or lagging. Adjustment in the commutation angle to bring it "in phase" allows for changes in the motor, its associated electronics, the input power to it, and the output loads it sees. Commutation angle control is performed over the entire speed range of the motor using a closed loop control strategy. This approach, which is particularly suitable for permanent magnet motors used in speed or torque control, or other applications having variables such as air flow (CFM), and provides optimal motor efficiency throughout its operating range. Of particular importance, the apparatus is "sensorless" in that it does not require any of the many various types of sensors used in previous commutation angle controllers. Equally as important, the apparatus does not monitor rotor position, nor does it sense BEMF as part of its control methodology.

With respect to the apparatus and its operation, it will be understood that the rotor position per se is not determined. Rather, commutation is adjusted until a predetermined current waveshape such as shown in FIG. 6A is produced. That is, a waveshape having a profile which, when sampled, meets the slope and amplitude requirements for the current set of motor operating conditions. Since on-line adjustment of the slope is realizable in accordance with the method of the invention, as described, optimal operation of the motor for a wide range of conditions is achieved. Finally, it will be understood that control means 26 of apparatus 10, or means 126 of apparatus 100 can be implemented using a microprocessor or microcontroller. Those skilled in the art will appreciate that the microprocessor or microcontroller is programmable to perform the steps or operations shown in the flow charts of FIGS. 8–10.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense. For example, the invention, as described, is intended for unidirectional operation of the motor. However, the motor M or M' may be made reversible by sensing bus current in each of the lines 16a and 16b.

Having thus described the invention, what is claimed and desired to be secured by Letters Patent is:

1. Apparatus for controlling the commutation angle of a dynamoelectric machine having a plurality of stator windings and a rotor for rotation with respect to said windings, comprising:
   power supply means for supplying voltage to the windings, said power supply means having an output supply line and a return supply line;
   means for sensing the current waveshape in at least one of the supply lines, said current having a waveshape the relative characteristics of which are a function of the commutation angle whether the commutation be at an optimal in phase angle, or lagging, or leading;
   commutation means for successively energizing the respective stator windings; and,
   processor means for deriving commutation angle information from the sensing means and for controlling operation of the commutation means on the basis of the information derived to adjust the commutation angle so it is in phase thereby operating the motor in a stable and efficient manner.

2. The apparatus of claim 1 wherein the power supply means includes a DC bus connected to the motor.

3. The apparatus of claim 2 wherein the sensing means senses the DC bus current waveshape.

4. The apparatus of claim 3 wherein the commutation means includes an inverter interposed between the bus and the motor, the inverter being responsive to control signals from the control means to energize and de-energize the stator windings.

5. The apparatus of claim 4 wherein the sensing means includes a sensor by which the current waveshape is developed.

6. The apparatus of claim 5 wherein the sensing means further includes amplifier means for amplifying the waveshape.

7. The apparatus of claim 5 wherein the processor means includes analog-to-digital conversion means for converting the sensed current waveshape characteristics to corresponding digital values.

8. The apparatus of claim 7 wherein the processor means further includes sampling means for sampling the converted waveshape at at least two points on the current waveshape for each commutation interval, and means for evaluating the two sampled points to determine the commutation angle.

9. The apparatus of claim 8 wherein the processor means further includes control means responsive to said evaluating means to increase or decrease the commutation interval, if the commutation angle is leading or lagging an optimal angle, for operating the motor at its optimal efficiency.

10. The apparatus of claim 1 wherein the control means controls the commutation angle over the entire operating range of the motor.

11. The apparatus of claim 10 wherein the processor means includes a microcontroller.

12. The apparatus of claim 7 wherein the processor means includes waveshape processing means for processing information samples relating to both the current waveshape and amplitude.

13. The apparatus of claim 9 wherein the processor means further includes drive control means for providing a frequency output used by the processor means to produce a control input to the inverter.

14. The apparatus of claim 9 wherein the processor means further includes drive control means for providing a voltage output used by the processor means to produce a control input to the inverter.

15. Apparatus for controlling the commutation angle of a dynamoelectric machine in the form of a motor having a plurality of stator windings and a rotor which rotates with respect to the windings comprising:
 a DC bus connected to the motor for supplying current to the windings, said current having a current waveshape the relative characteristics of which are a function of the commutation angle of the motor;
 an inverter interposed between the bus and the motor for successively energizing and de-energizing respective ones of the stator winding plurality to commutate the windings in a selected sequence;
 means for sensing the current waveshape; and,
 processor means for controlling operation of the inverter to control the commutation angle and optimize the efficiency of the motor throughout its entire range of operation, the processor means including waveshape processor means responsive to the sensing means for sampling the current waveshape to obtain commutation angle information and for evaluating the samples to determine if the commutation angle is at an optimal angle, or leading or lagging the optimal angle, and control means responsive to the evaluation of the samples to increase or decrease the commutation interval of the windings, if the commutation angle is not the optimal angle, thereby to achieve motor efficiency for the input power supplied by the bus and an output load on the motor.

16. The apparatus of claim 15 wherein the sampling means samples the current waveshape at at least two points on the waveshape envelope for each commutation interval.

17. The apparatus of claim 15 wherein the inverter is a pulse width modulated inverter.

18. The apparatus of claim 15 wherein the inverter is a six-step inverter.

19. The apparatus of claim 16 wherein the sensing means includes resistance means across which the current waveshape is developed, and amplifier means for amplifying the sensed waveshape.

20. The apparatus of claim 19 wherein the processor means includes analog-to-digital conversion means for converting sensed waveshape characteristics to corresponding digital values.

21. The apparatus of claim 15 wherein the waveshape processor means includes means for determining the slope of the waveshape.

22. The apparatus of claim 21 wherein the waveshape processor means further includes means for determining the amplitude of the waveshape.

23. Apparatus for controlling the commutation angle of a motor having a plurality of stator windings for each phase and a rotor which rotates with respect to the windings comprising:
 a DC bus connected to the motor for supplying current to the windings, said current having a current waveshape whose characteristics are a function of the commutation angle;
 an inverter interposed between the bus and the motor for successively energizing and de-energizing the respective stator windings to commutate the windings;
 means for sensing the current waveshape; and,
 a microcontroller responsive to the sensing means for sampling the current waveshape at at least two points to obtain commutation angle information, for evaluating the samples to determine if the commutation angle is an optimal angle or leading or lagging the angle, the commutation angle being indicated by the slope of the waveshape as determined by the samples, and for increasing or decreasing the commutation interval based on the evaluation of the samples so the commutation angle is adjusted to the optimal angle for the motor operating conditions.

24. A method of controlling the commutation angle in a dynamoelectric machine comprising:
 commutating windings of the machine by systematically energizing and de-energizing them;
 sampling a resultant current waveshape, the waveshape having characteristics which are a function of the commutation angle;
 obtaining commutation angle information from the sampled current waveshape; and
 controlling the commutation angle in response to the information obtained.

25. The method of claim 24 further including sensing the current waveshape; and,
 sampling the sensed waveshape at at least two separate points on the waveshape envelope for each commutation interval.

26. The method of claim 25 wherein controlling commutation includes evaluating the samples to determine if the commutation angle is at an optimal angle for the machine operating conditions, or leading or lagging the optimal angle; and,
 as appropriate, increasing or decreasing the commutation interval to vary the commutation angle until it changes to the optimal angle.

27. A method of controlling the commutation of a brushless permanent magnet motor having a plurality of stator windings and a rotor which rotates with respect to the windings comprising:
 supplying voltage from a DC bus to the windings to energize the windings;
 commutating the respective stator windings;
 sensing the DC bus current waveshape, the waveshape having a relative characteristics which are a function of the commutation angle of the motor;
 continuously sampling the sensed waveshape to obtain commutation angle information, the waveshape being sampled at at least two points during each commutation interval;

evaluating the sample information to determine if the instantaneous commutation angle is at an optimal angle or leading or lagging the optimal angle; and, increasing or decreasing the commutation interval if the commutation angle is not the optimal angle thereby to achieve motor efficiency for the input power supplied by the bus and an output load on the motor.

28. The method of claim 27 wherein sensing the waveshape includes impressing the winding current on a resistance means to develop the current waveshape, amplifying the waveshape, and performing an analog-to-digital conversion of the waveshape to convert the waveshape characteristics to corresponding digital values.

29. The method of claim 28 including performing the sampling and evaluation steps using a microcontroller; and, performing the commutating step using an inverter to which control signals are supplied to control the commutation interval.

30. A method of controlling the commutation of a switched reluctance motor having a plurality of stator windings and a rotor which rotates with respect to the windings comprising:

supplying voltage from a DC bus to the windings to energize the windings;

commutating the respective stator windings;

sensing the DC bus current waveshape, the waveshape having a relative characteristics which are a function of the commutation angle of the motor;

continuously sampling the sensed waveshape to obtain commutation angle information, the waveshape being sampled at at least two points during each commutation interval; evaluating the sample information to determine if the instantaneous commutation angle is at an optimal angle or leading or lagging the optimal angle; and, increasing or decreasing the commutation interval if the commutation angle is not the optimal angle thereby to achieve motor efficiency for the input power supplied by the bus and an output load on the motor.

31. A circuit for controlling a brushless permanent magnet motor including a stationary assembly having a plurality of winding phases associated with it and a rotor assembly mounted for rotation with respect to the stationary assembly, comprising:

a pair of DC lines;

power supply means for supplying a voltage to said DC lines;

commutation means for successively energizing the respective winding phases connected between said DC lines and said phases, said commutations means energizing respective ones of said winding phases at a commutation angle;

means for sensing the current waveshape passing through the winding phases operatively electrically connected in at least one of said DC lines;

means for determining a commutation angle position from said current waveshape; and means for generating a control signal based on the commutation angle position derived from the sensed current waveshape for controlling the commutation means so as to bring the commutation angle to a desired angle by altering the commutation interval for selected ones of said winding phases.

32. A circuit for controlling a switched reluctance motor including a stationary assembly having a plurality of winding phases associated with it and a rotor assembly mounted for rotation with respect to the stationary assembly, comprising:

a pair of DC lines;

power supply means for supplying a voltage to said DC lines;

commutation means for successively energizing the respective winding phases connected between said DC lines and said phases, said commutations means energizing respective ones of said winding phases at a commutation angle;

means for sensing the current waveshape passing through the winding phases operatively electrically connected in at least one of said DC lines;

means for determining a commutation angle position from said current waveshape; and means for generating a control signal based on the current waveshape for controlling the commutation means so as to bring the commutation angle to a desired angle by altering the commutation interval for selected ones of said winding phases.

33. Apparatus for controlling the commutation angle of a dynamoelectric machine having a plurality of stator windings and a rotor for rotation with respect to said windings, comprising:

power supply means for supplying voltage to the windings, said power supply means having an output supply line and a return supply line;

means for sensing the current waveshape in at least one of the supply lines, said current having a waveshape the relative characteristics of which are a function of the commutation angle whether the commutation be at an optimal angle, or lagging, or leading, the sensing means including a sensor by which the current waveshape is developed, amplifier means for amplifying the waveshape, and means for converting the sensed current waveshape characteristics to corresponding digital values;

commutation means for successively energizing the respective stator windings; and, processor means for deriving commutation angle information from the sensing means and for controlling operation of the commutation means on the basis of the information derived to adjust the commutation angle so it is optional thereby to operate the motor in a stable and efficient manner, the processor means including sampling means for sampling the converted waveshape at at least two points for each commutation interval, means for evaluating the two sampled points to determine the commutation angle and control means responsive to said evaluating means to increase or decrease the commutation interval, if the commutation angle is leading or lagging the optimal angle.

34. The apparatus of claim 33 wherein the processor means includes waveshape processing means for processing information samples relating to both the current waveshape and amplitude, and the processor means further includes drive control means providing either a frequency output or a voltage output used by the processor means to produce a control input to the inverter.

35. Apparatus for controlling the commutation angle of a motor having a plurality of stator windings and a rotor which rotates with respect to the windings comprising:

a DC bus connected to the motor and supplying current to the windings, said current having a current waveshape whose relative characteristics are a function of the motor's commutation angle;

an inverter interposed between the bus and the motor and successively energizing and de-energizing respective stator winding to commutate the windings in a desired sequence;

means for sensing the current waveshape; and, processor means for controlling operation of the inverter to control the commutation angle and optimize the efficiency of the motor throughout its entire range of operation, the processor means including waveshape processor means having sampling means for sampling the current waveshape at at least two points on the waveshape for each commutation interval, the sampling means being responsive to the sensing means for sampling the current waveshape to obtain commutation angle information and for evaluating the samples to determine if the commutation angle is at an optimal angle, or leading or lagging the optimal angle; and, control means responsive to the evaluation of the samples to increase or decrease the commutation interval of the windings, if the commutation angle is not the optimal angle, thereby to achieve motor efficiency.

36. In a dynamoelectric machine having a plurality of individually energized phases, each phase having an associated phase winding to which current is supplied when the phase is energized, and a rotor rotatable with respect to the phase windings, and means for supplying current to the individual phase windings in a controlled sequence for commutation of the machine, the improvement comprising means for evaluating the current waveshape of the current supplied to the windings to determine a commutation angle between the rotor and the phase windings, the evaluating means obtaining a plurality of current measurements during each commutation interval to determine a commutation angle between the rotor and the phase windings, the evaluating means obtaining a plurality of current measurements during each commutation interval of a phase and deriving from the measurements both the amplitude and the slope of the current waveshape, the amplitude and slope of the waveshape indicating whether the commutation angle is a desired in-phase angle, or a leading or a lagging angle, and means responsive to the determination of the commutation angle for controlling operation of the current supply means to adjust the commutation interval for the phases to adjust the commutation angle to the desired in-phase angle for a particular set of machine operating conditions.

37. In a polyphase dynamoelectric machine having a plurality of individually energized phase windings and a rotor which rotates with respect to the windings, current to the phase windings being supplied to the phase windings from a current bus through an inverter controlled by a processor to effect switching between machine phases by selective energization and deenergization of the respective phase windings, sensing means for sensing a bus current waveshape and sampling means for sampling an output of the sensing means to determine the slope of the waveshape, the processor processing waveshape slope information developed by the sampling means to determine by the current waveshape slope whether a commutation angle between the rotor and phase windings is at an optimal angle, or a leading or a lagging angle with respect thereto, the processor controlling a frequency or voltage input to the inverter to effect the timing of the inverter in energizing and deenergizing the respective machine phases to maintain or bring the commutation angle to the optimal angle for a given set of machine operating conditions.

38. A control device for controlling the commutation angle of a motor having a stator assembly including a plurality of windings, and a rotor assembly mounted for rotation with respect to the stator, the motor being connected to a source of D.C. power, comprising:

a DC bus including a pair of lines connected to the motor for supplying current to the windings, and returning current to the DC source, the current in at least one of said pair of lines having a current waveshape dependent upon an operating characteristic of the motor;

an inverter operatively connected between the DC bus and the motor for successfully energizing and de-energizing respective one of said stator windings in a desired sequence, thereby establishing a commutation interval for each winding;

means for sensing the current waveshape in at least one of said lines; and

A processor for controlling operation of the inverter, such that motor efficiency is optimized during motor operation, the processor including a waveshape processor having sampling means for sampling the current waveshape at least two points of the waveshape for each commutation interval, the sampling means being operatively connected to the sensing means and including means for comparing the current waveshape to a desired current waveshape, said processor means controlling the inverter to bring and maintain the current waveshape into correspondence with the desired waveshape based on the waveshape information so obtained.

* * * * *